United States Patent [19]

Schofield et al.

[11] Patent Number: 4,461,647

[45] Date of Patent: Jul. 24, 1984

[54] FLUIDIZING AGENT

[75] Inventors: John D. Schofield, Bury, England; Arne Vinther, Køge, Denmark

[73] Assignee: Imperial Chemical Industries Limited, London, England

[21] Appl. No.: 401,713

[22] Filed: Jul. 26, 1982

[30] Foreign Application Priority Data

Aug. 11, 1981 [GB] United Kingdom ................. 8124507

[51] Int. Cl.³ .............................................. C09C 1/00
[52] U.S. Cl. ................................................ 106/308 N
[58] Field of Search .................................... 106/308 N

[56] References Cited

U.S. PATENT DOCUMENTS

| | | | |
|---|---|---|---|
| 3,759,731 | 9/1973 | Kuhne et al. | 106/288 Q |
| 3,759,733 | 9/1973 | Bradley et al. | 106/309 |
| 3,775,148 | 11/1973 | Bradley | 106/288 Q |
| 4,057,436 | 11/1977 | Davies et al. | 106/308 N |
| 4,125,413 | 11/1978 | Davies et al. | 106/308 N |

FOREIGN PATENT DOCUMENTS

| | | | |
|---|---|---|---|
| 0012944 | 6/1979 | European Pat. Off. | 106/308 N |
| 1313147 | 7/1973 | United Kingdom | 106/308 N |
| 1425522 | 1/1976 | United Kingdom | 106/308 N |

OTHER PUBLICATIONS

Japanese Patent 45-11026 (Toyo)—Derwent Japanese Patent Report, vol. R, No. 17, 1970, p. 4.

Primary Examiner—James Poer

[57] ABSTRACT

An agent for enhancing the fluidity of pigment dispersions comprising a composition of disazo compounds containing a water-insoluble disazo compound in which one of the terminal aromatic groups carries a single substituted ammonium-acid salt group, pigments treated with the agent and non-aqueous pigment dispersions containing the agent.

12 Claims, 1 Drawing Figure

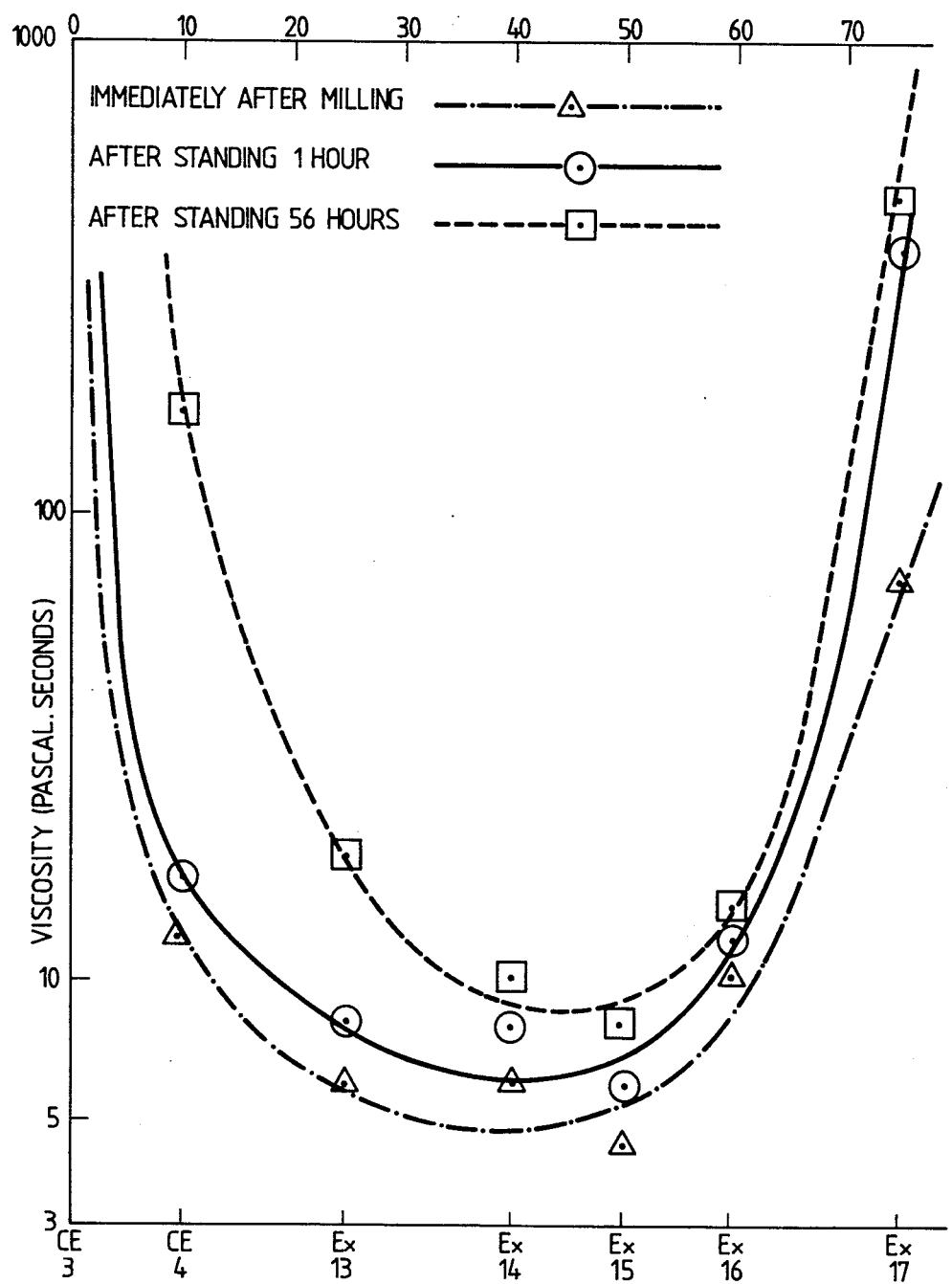

FLUIDIZING AGENT

This specification describes an invention relating to dispersions of pigments in non-aqueous organic liquids and particularly to a composition for enhancing the fluidity of such dispersions, especially at high pigment concentrations.

It is known from UK Pat. No. 1,356,253 (Ciba-Geigy) to incorporate in diarylide pigments water-soluble, azo dyestuffs which have the same general structure as the pigment but contain acidic groups. All the water-soluble dyes disclosed are symmetrical and contain at least two acidic group. The treated pigments, particularly those which are further reacted with amines, are stated to be suitable for the preparation of inks having improved rheological properties.

It is also known from UK Pat. No. 1,339,068 (Hoechst) to incorporate a small proportion (up to 20 mole%) of a coupling component containing an acidic group in the manufacture of of a diarylide pigment so as to prepare a pigment composition containing a small proportion of disazo compounds containing acidic groups. Some of these disazo compounds contain two acidic groups while others contain a single acidic group. Ink derived from the pigment composition is stated to have improved rheological properties compared to normal, untreated pigment.

According to the present invention there is provided a composition of disazo compounds (hereinafter referred to as "the fluidising agent") containing at least 30%, by weight, of a water-insoluble disazo compound (hereinafter referred to as "the asymmetric compound") comprising a central divalent group free from acidic and other ionic substituents linked through azo groups to two monovalent end groups characterised in that one end group, the first, is free from acidic and other ionic substituents and the other end group, the second, carries a single substituted ammonium-acid salt group (hereinafter referred to as "the salt group").

The central divalent group of the asymmetric compound is preferably a biphenylene group which may be unsubstituted or substituted by one or more non-ionic groups selected from lower ($C_{1-4}$) alkyl, especially methyl, lower ($C_{1-4}$) alkoxy, especially methoxy, halo, especially chloro, nitro and cyano. Specific examples of such central groups are, biphenylene, 2,2'-dichlorobiphenylene, 3,3'-dichloro-biphenylene, 2,2'-dichloro-5,5'-dimethoxybiphenylene, 3,3'-dimethoxybiphenylene and 3,3'-dimethylbiphenylene. Another preferred central group is a biphenylene group, optionally carrying the above mentioned substituents, but also carrying, in the 4 and 4' positions, bridging acetoacet-2-ylamino groups through which it is linked to the azo groups and ultimately to the end groups. Examples of such a central group are 4,4'-di(acetoacet-2-ylamino)-biphenyl) and 4,4'-di(acetoacet-2-yl-amino)-3,3'-dimethylbiphenyl, as found in CI Pigment Yellows 16 and 77.

The first end group of the asymmetric compound, which is free from ionic substituents, is preferably a pyrazolin-5-on-4-yl, a 2-hydroxynaphth-1-yl or an acetoacet-2-ylanilide group, such groups being typically present in disazo pigments. Provided these groups are free from ionic substituents they may carry other substituents such as lower alkyl, lower alkoxy, halo, nitro, cyano, lower alkoxy-carbonyl, phenylaminocarbonyl, naphthylaminocarbonyl and phenyl in which the phenyl and naphthyl groups are optionally substituted by lower alkyl, lower alkoxy, nitro, halo or cyano.

Examples of the first end group are:

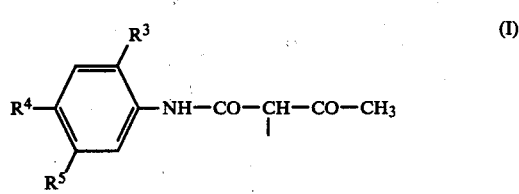

wherein $R^3$, $R^4$ and $R^5$ are selected from H, lower alkyl, lower alkoxy, nitro and halo, specific examples being shown in the following table:

| $R^3$ | $R^4$ | $R^5$ |
| --- | --- | --- |
| H | H | H |
| —CH₃ | —CH₃ | H |
| —CH₃ | H | H |
| —OCH₃ | H | H |
| H | —CH₃ | H |
| —OCH₃ | Cl | —OCH₃ |
| Cl | H | H |
| —OCH₃ | H | —OCH₃ |
| H | —OC₂H₅ | H |

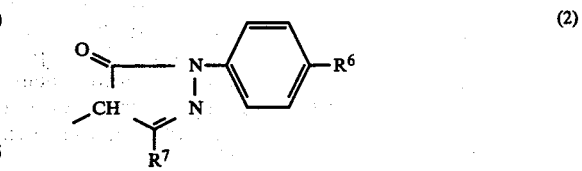

wherein $R^6$ and $R^7$ are selected from H, lower alkyl, lower alkoxy, halo, nitro and lower alkoxy-carbonyl, specific examples being shown in the following table:

| $R^6$ | $R^7$ |
| --- | --- |
| H | —CH₃ |
| —CH₃ | —CH₃ |
| H | —CO₂C₂H₅ |
| —NO₂ | —CH₃ | and

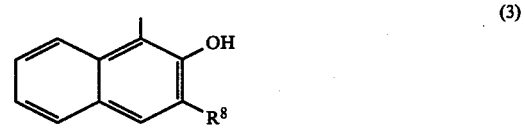

wherein $R^8$ is H or a group of the formula:

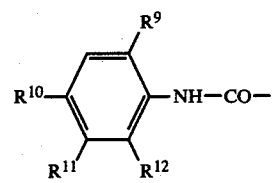

wherein $R^9$ to $R^{12}$ are selected from H, lower alkyl, lower alkoxy, halo and nitro, specific examples being shown in the following table:

| R⁹ | R¹⁰ | R¹¹ | R¹² |
|---|---|---|---|
| H | H | —CH₃ | —CH₃ |
| H | H | NO₂ | H |
| H | Cl | H | H |
| H | —CH₃ | H | H |
| H | H | H | —CH₃ |
| H | H | H | —OCH₃ |
| H | H | H | —OC₂H₅ |
| H | Cl | H | —CH₃ |
| Cl | H | —CH₃ | H |
| —OCH₃ | H | —OCH₃ | H |
| —OCH₃ | —OCH₃ | Cl | H | or R⁸ is of the formula:

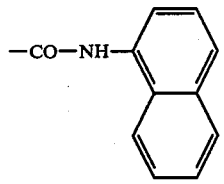

The second end group of the asymmetric compound, carrying the salt group, may be otherwise identical to the first end group or may be selected from any of the first end groups defined above with the addition of the salt group. The second end group is preferably an acetoacet-1-ylanilide group in which the salt group is in the 4 position on the benzene ring with respect to the amino group, a 1-phenylpyrazolin-5-on-4-yl group in which the salt group is in the 4 position on the phenyl substituent or a 2-naphth-1-yl group in which the salt group is in the 6 position on the naphthalene ring such as:

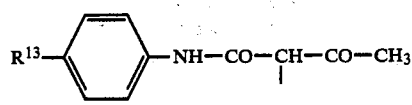

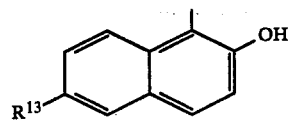

and

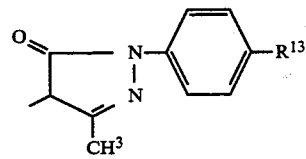

wherein R¹³ is the salt group.

The substituted ammonium-acid salt group is preferably a substituted ammonium carboxylate or phosphonate group or, more especially, a substituted ammonium sulphonate group. The substituted ammonium-acid salt group preferably contains at least one fatty aliphatic group attached to the nitrogen atom of the ammonium ion. This substituted ammonium ion desirably contains at least 6, preferably at least 12, and more preferably from 16 to 80, carbon atoms in from 1 to 4 aliphatic groups. In a particularly useful fluidising agent the ammonium ion has 3 or 4 aliphatic groups containing in total from 16 to 60 and more preferably from 25 to 40 carbon atoms. It is also preferred that at least one of the aliphatic groups is, or comprises, an alkyl or alkenyl chain containing at least 8, and more preferably at least 12, carbon atoms, and especially from 12 to 20 carbon atoms. It is especially preferred that at least one of the aliphatic groups contains at least 16 carbon atoms.

The composition of the invention preferably contains from 30% to 70%, more preferably from 35% to 65%, and especially from 40% to 60%, by weight, of the asymmetric compound.

A preferred composition according to the present invention contains an asymmetric compound of the formula:

Y—X—A—X—Z wherein
A is selected from biphenylene, 3,3'-dichlorobiphenylene, 3,3'-dimethoxybiphenylene, 3,3'-dimethylbiphenylene and 2,2'-dichloro-5,5'-dimethoxybiphenylene;
X is

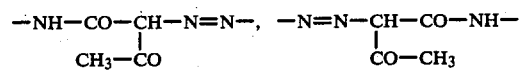

or —N=N— when X is —N=N—,
Y is selected from pyrazolin-5-on-4-yl, 2-hydroxynaphth-1-yl and 2-hydroxy-3-carbonylaminophenylnaphth-1-yl which may be substituted by one or more groups selected from lower alkyl, lower alkoxy, halo, nitro and lower alkoxy-carbonyl and when X is

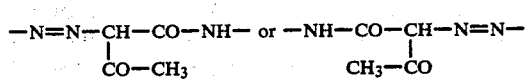

Y is phenyl or phenyl substituted by one or more groups selected from lower alkyl, lower alkoxy, halo and nitro; and
Z is selected from the same groups as Y except that it carries a salt group in addition to or in place of one of the substituents already on Y.

An especially preferred composition comprises a mixture of disazo compounds of the formulae:

Y—X—A—X—Z

Y—X—A—X—Y

Z—X—A—X—Z containing at least 35%, and more preferably from 40 to 60%, by weight of the asymmetric compound

Y—X—A—X—Z and a particularly useful composition contains from 50% to 60% of this asymmetric compound.

The compound of the present invention is particularly useful for enhancing the fluidity of dispersions of pigments in organic liquids and according to a further feature of the present invention there is provided a dispersion of a pigment in an organic liquid containing a fluidising agent hereinbefore defined.

The pigment used in the dispersion may be selected from those disclosed in UK Patent No. 1,508,576 (at page 3 lines 11 to 26) although preferred pigments are from the azo series especially mono- and dis-azo pigments and particularly pigments of the same general structure as the fluidising agent, although free from acidic or other ionic groups, i.e. disazo pigments and especially diarylide and condensed disazo pigments.

The dispersions of such pigments are usually prepared with the aid of a dispersing agent, generally a resinous or polymeric material, which is mixed with the pigment before or during its comminution in order to protect the finely divided pigment particles from reaggregation and flocculation. Suitable dispersing agents are those disclosed in UK Pat. No. 1,508,576 (from page 3 line 36 to page 7 line 13) and in UK Specification No. 2056461A (at page 2 lines 12 to 27). An especially preferred dispersing agent is an amide of a polyester, hereinafter referred to as "a polyester-amide", derived from a hydroxycarboxylic acid of the formula, HO—B—COOH, wherein B is a divalent saturated or unsaturated radical containing at least eight carbon atoms and in which there are at least four carbon atoms between the hydroxy and carboxylic acid groups, or from a mixture of such a hydroxy carboxylic acid and a carboxylic acid which is free from hydroxy groups such as are described in UK Pat. No. 1,373,660.

The mean diameter of the pigment particles in the dispersion is preferably below 10 microns and more preferably below 1 micron.

The organic liquid may be any of those disclosed in UK Pat. No. 1,508,576 (at page 7 lines 53 to 62) although for the present invention preferred liquids are aromatic hydrocarbons such as benzene, xylene and toluene but, more especially preferred are aliphatic hydrocarbons such as petroleum fractions and white spirit.

The dispersion of this invention preferably contains from 5% to 70%, by weight, of pigment, based upon the total weight of the dispersion, and from 1% to 50%, by weight, of fluidising agent and from 3% to 50%, by weight, of dispersing agent, both based on the weight of pigment in the dispersion, especially preferred levels for the pigment, fluidising agent and dispersing agent being from 25% to 60%, from 5% to 15% and from 10% to 30%, respectively.

The fluidising agent may be incorporated into the dispersion during or after its preparation by standard milling techniques but, as the agent is only sparingly soluble in organic liquids, it is preferably mixed with the other ingredients of the dispersions prior to comminution of the pigment particles in order to promote contact between the agent and the pigment. Alternatively the fluidising agent may be incorporated into the pigment during manufacture thereof, i.e. before or during coupling, but more preferably after completion of coupling, e.g. during isolation, washing or drying.

The central group of the asymmetric compound may be derived from a tetrazotised aromatic diamine which is free from ionic substituents and the end groups may be derived from two coupling components, one of which carries an acidic group, capable of conversion into a substituted ammonium-acid salt group, and the other of which is free from acidic groups or any other ionic substituents.

According to a another feature of the present invention there is provided a process for the preparation of a fluidising agent as hereinbefore defined which comprises coupling a tetrazotised aromatic diamine free from acidic and other ionic substituents with a mixture of a coupling component which is free from acidic or other ionic substituents and a coupling component containing a single acidic group and reacting the disazo compound so formed with an amine or a substituted ammonium compound.

In a preferred process one molecular proportion of the tetrazotised aromatic diamine is reacted with from 0.5 to 1.5, more preferably from 0.5 to 1.3, molecular proportions of a coupling component containing at least one acidic group and from 1.5 to 0.5, more preferably from 1.5 to 0.7, molecular proportions of a coupling component which is free from acidic or other ionic substituents and the disazo compound so formed is reacted with an amine or a substituted ammonium compound. An especially preferred process uses one molecular proportion of the tetrazotised diamine and one molecular proportion of each of the two coupling components.

A preferred diamine has the formula:

$$H_2N-A-NH_2 \qquad \text{II}$$

wherein A is is as hereinbefore defined.

Preferred coupling components from which the first end group may be derived are from the acetoacetanilide series which may be substituted in the benzene ring by one or more non-ionic, non-acidic groups selected from halo, nitro, lower alkyl and lower alkoxy, from the 1-phenylpyrazolin-5-one series which may be substituted in the pyrazole or benzene rings by groups selected lower alkyl, lower alkoxy, halo, lower alkoxycarbonyl and nitro and from the naphth-2-ol series, the 3-(phenyl-, or the 3-(naphthyl-, aminocarbonyl)naphth-2-ol series which may be substituted in the phenyl or naphthyl rings by groups selected from lower alkyl, lower alkoxy, halo and nitro.

Preferred coupling components from which the second end group may be selected are the acetoacetanilide series and the 1-phenylpyrazolin-5-one series mentioned above but also containing an acidic group, preferably a carboxylate, a phosphonate or more especially a sulphonate group.

Examples of suitable coupling components from which the first end group may be derived are:

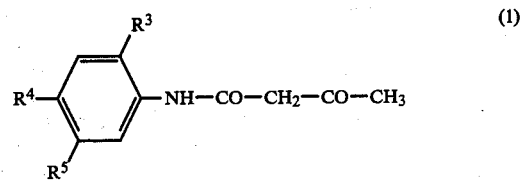
(1)

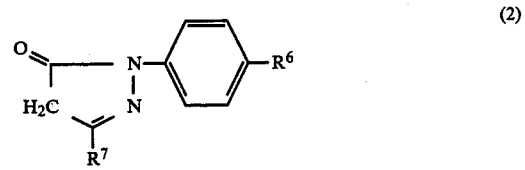
(2)

and

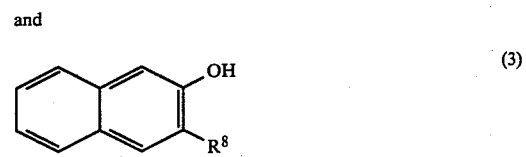
(3)

wherein $R^3$ to $R^8$ are as hereinbefore defined.

Preferred coupling components from which the second end group may be derived are from the same series as those from which the first end group is derived except for the presence in the component of an acidic group, and especially a sulphonic acid group, such as:

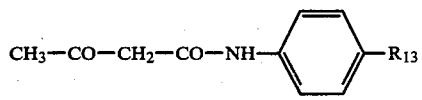

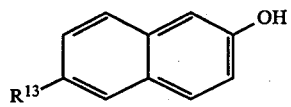

and

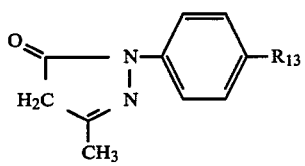

wherein $R_{13}$ is —$PO_3H_2$, COOH or more especially —$SO_3H$.

Specific examples of suitable coupling components from which the second end group may be derived are 2-naphthol-, -4-sulphonic acid, -6-sulphonic acid, -7-sulphonic acid and -8-sulphonic acid; 1-naphthol-, -4-sulphonic acid, -3-sulphonic acid, -5-sulphonic acid and -8-sulphonic acid; 8-chloronaphth-1-ol-5-sulphonic acid; 1(3-methyl-5-oxo-2-pyrazolin-1-yl)-, -benzene-4-sulphonic acid, -2-chlorobenzene-5-sulphonic acid, -6-chlorobenzene-2-sulphonic acid, -2-chlorobenzene-4-sulphonic acid, -4-chlorobenzene-2-sulphonic acid, -2,5-dichlorobenzene-4-sulphonic acid, -benzene-3-sulphonic acid, -benzene-2-sulphonic acid, -2,3,6-trichlorobenzene-5-sulphonic acid, -2-chloro-6-methylbenzene-4-sulphonic acid and -2-methylbenzene-4-sulphonic acid.

The amine or substituted ammonium salt preferably contains at least one fatty aliphatic group attached to the nitrogen atom of the amine or ammonium ion. The amine or substituted ammonium ion desirably contains at least 6, preferably at least 12, and more preferably from 16 to 80 carbon atoms in from 1 to 4 aliphatic groups. A particularly useful amine or ammonium ion has 3 or 4 aliphatic groups containing in total from 16 to 60 and more preferably from 25 to 40 carbon atoms. It is also preferred that at least one of the aliphatic groups is, or comprises, an alkyl or alkenyl chain containing at least 8, and more preferably at least 12, carbon atoms, and especially from 12 to 20 carbon atoms. It is especially preferred that at least one of the aliphatic groups contains at least 16 carbon atoms.

Examples of the amines and substituted ammonium compounds, e.g. halides and hydroxides, which may be used to form the fluidising agent are given in UK Patent Specification No. 1,566,803 (at page 2 lines 62 to 109) and in UK Patent Specification No. 1,508,576 (at page 7 lines 14 to 37).

This process produces a composition containing three disazo compounds two of which are symmetrical and the third, the asymmetric compound, is unsymmetrical. It is the asymmetric compound which is believed to give the present composition its particularly useful properties and production of this asymmetric compound can be optimised by use of equimolar quantities of the two coupling components. The two coupling components are preferably of the same structural type, although they may carry some different substituents, apart from the presence of the acidic group in one of them.

The fluidising agent of the present invention is substantially insoluble in water as is the asymmetric compound carrying a single salt group and the free acid from which it is derived by reaction with an appropriate amine or substituted ammonium salt. In contrast, the disazo dyestuffs containing two acidic groups, used to prepare the treated pigment compositions of UK Pat. No. 1,356,253, are soluble in water.

The invention is further illustrated by the following Examples in which all parts and percentages are by weight unless otherwise indicated.

EXAMPLE 1

Solution A:

Tetrazo 3,3'-dichlorobenzidine was prepared by tetrazotising 38 g of 3,3'-dichlorobenzidine in 1200 g of water at 0° C.

Solution B:

A mixture of 28 g acetoacetanilide (1st coupling component) and 46.5 g of potassium N-acetoacetyl-4-sulphanilate (2nd coupling component) was stirred into 500 g of water. To the slurry were added 13.5 g of 46.7% sodium hydroxide, and the temperature raised to complete solution of the acetoacetanilide. To the solution were added 16 g of glacial acetic acid, 18.9 g of 36% hydrochloric acid and 700 g of water.

Coupling:

solution A was added to Solution B over 75 minutes, the pH being controlled at 4.3 by the addition of sodium acetate. The reaction mixture was stirred overnight and then tested to ensure that no excess tetrazo was present.

The reaction mixture was then heated to 70° C., 75.5 g of dioctadecyldimethylammonium chloride (DODMAC) was added, and the mixture stirred for 1 hour at 70° C. The product, Fluidising Agent 1, made with equimolecular proportions of the two coupling components, was filtered off, washed with water and dried at 50°-60° C.

EXAMPLES 2 TO 5 AND COMPARATIVE EXAMPLES (CE) 1 AND 2

These Examples were prepared in the same manner as Example 1, by tetrazotising 38 g 3,3'-dichlorobenzidine, coupling it with a mixture of acetoacetanilide (1st component) and the potassium salt of N-acetoacetyl-4-sulphanilic acid (2nd component), using the quantities of these two coupling components specified in Columns 2 and 3 of Table 1, and stirring the product with the quantity of DODMAC specified in Column 4 of Table 1. The products of these Examples are entitled Fluidising Agents (FA) 3 to 6 and Comparative Agents (CA) 1 and 2 respectively. The figures in brackets in Columns 2 and 3 are the relative molecular proportions of the two coupling components.

TABLE 1

| Example | Weight 1st Component (g) | Weight 2nd Component (g) | Weight DODMAC (g) | Product Name |
|---|---|---|---|---|
| CE 1 | 50.4 (0.90) | 9.4 (0.10) | 15.1 | CA 1 |
| 2 | 43.5 (0.75) | 24.5 (0.25) | 37.7 | FA 2 |
| 3 | 33.6 (0.60) | 37.4 (0.40) | 60.4 | FA 3 |

TABLE 1-continued

| Example | Weight 1st Component (g) | Weight 2nd Component (g) | Weight DODMAC (g) | Product Name |
|---|---|---|---|---|
| 4 | 22.4 (0.40) | 56.0 (0.60) | 90.6 | FA 4 |
| 5 | 14.0 (0.25) | 70.0 (0.75) | 113.2 | FA 5 |
| CE 2 | 0.0 (0.00) | 93.0 (1.00) | 151.0 | CA 2 |

Comparative Agent 1 is prepared in accordance with the teaching of UK Pat. No. 1,339,068, i.e. using a 90:10 mol% mixture of a normal pigment coupling component and a coupling component containing an acidic group.

Comparative Agent 2 is prepared in accordance with the teaching of UK Pat. No. 1,356,253, i.e. using only a coupling component containing an acidic group so that all the molecules of the disazo compound contain two acidic groups and corresponds to the disazo compound used in Example 7 of the patent.

Fluidising Agents 2 to 5 are all in accordance with the present invention being made using from 25 to 75 mol% of a coupling component containing an acidic group and from 75 to 25 mol% of a normal pigment coupling component.

EXAMPLE 6

Solution A:

A mixture of 7.7 g 2,2'-dimethoxybenzidine dihydrochloride and 8.75 g 3,3'-dichlorobenzidine dihydrochloride in 500 g water at 0° C. was tetrazotised to convert both amines into their tetrazo derivatives.

Solution B:

A mixture of 9.6 g 1-phenyl-3-methylpyrazolin-5-one and 14.3 g 1-(4-sulphophenyl)-3-methylpyrazolin-5-one in 200 g water was prepared. The mixture was warmed to 50° C. and a 32% solution of sodium hydroxide was added, with stirring, until complete solution occurred and the solution was alkaline to Clayton Yellow indicator paper. The solution was then cooled to 20° C.

Coupling:

Solution B was added to Solution A over 45 minutes, the reaction mixture being maintained acid to Congo Red indicator during the coupling. The reaction mixture was stirred overnight and then tested to ensure that no excess tetrazo was present. When coupling was complete the pH was adjusted to 3 and the reaction mixture heated to 70° C. To the hot reaction mixture was added 34.6 g of DODMAC and stirring continued for 30 minutes at 70° C. The product, Fluidising Agent 6, was filtered off, washed with water and dried at 50°-60° C.

EXAMPLE 7

Solution A:

Tetrazo-3,3'-dichlorobenzidine was prepared by tetrazotising 13.45 g of 3,3'-diclorobenzidine in 500 g of water at 0° C.

Solution B:

A mixture of 7.2 g of 2-naphthol and 12.3 g of the sodium salt of 6-hydroxy-2-naphthalene sulphonic acid (Schaeffer's acid) was stirred into 500 g of water. A 30% aqueous solution of sodium hydroxide was then added with stirring until the pH was 8.5.

Coupling:

Solution (A) was added to Solution (B) over 1 hour, during which the temperature was maintained below 10° C. and the pH was controlled at 8.5 by the addition of a 30% solution of sodium hydroxide. The reaction mixture was stirred for 1 hour, then heated to 90° C., cooled and filtered.

The filter cake was reslurried in 900 g of water, heated to 70° C. and the pH adjusted to 3 by the addition of dilute hydrochloric acid. To the stirred acid slurry was added 22.5 g of DODMAC over 10 minutes and the mixture stirred for 1 hour at 70° C. The product, Fluidising Agent 7, was filtered off, washed with water and dried at 50°-60° C.

EXAMPLE 8

(a) Dioctadecyldimethyl ammonium hydroxide (DODMAH) was prepared by passing a solution of 16.5 g of DODMAC in 200 g of isopropanol and 100 g of a petroleum fraction boiling at 100°-20° C. (SBP 3) through a column containing 28 g of an ion exchange resin suitable for use with organic solvents (AMBERLYST A-26) which had previously been converted into its hydroxide form. The solvents were removed by distillation to leave a waxy solid.

(b) Solution A:

Tetrazo-3,3'-dichlorobenzidine was prepared by tetrazotising 31.5 g of 3,3'-dichlorobenzidine in 350 g of water at 0° C.

Solution B:

A mixture of 17.6 g of acetoacetanilide and 22 g of N-acetoacetyl-4-aminobenzoic acid was stirred into 800 g of water. To the slurry was added 40 g of 30% aqueous sodium hydroxide and the mixture warmed to complete dissolution of the solid. The solid was reprecipitated by the addition of acetic acid with vigorous stirring until the pH was reduced to 5.5.

Coupling:

Solution A was added to Solution B over 90 minutes, while the temperature was maintained at 20° C. and the pH at 5.5 by the addition of 5N sodium acetate solution. The reaction mixture was then heated to 90° C., cooled, filtered and the filter cake washed with water. A portion of the filter cake containing 8.3 g (dry weight) of the product was reslurried in 200 g of water, heated to 70° C. 1.7 g of DODMAH, prepared as described in (a) above, added with stirring. After the further addition of 150 g of isopropanol the product, Fluidising Agent 8, was filtered, washed with water and dried at 50°-60° C.

Dispersing Agent 1

A mixture of 320 g of poly(12-hydroxystearic acid), having an acid value of 35 mg KOH/g, 10.2 g dimethylaminopropylamine and 65 g of toluene was stirred under reflux using a Dean & Stark head to remove the water. The temperature was then raised to 165° C. and held there for 6 hours. After cooling to room temperature under nitrogen an 87.6% solution of the adduct between the two reactants was obtained.

To 226 g of this adduct stirring at 40° C. was added 6.7 g of dimethyl sulphate. An exotherm resulted, raising the temperature to 50° C., and this was further raised to 90° C. by the application of external heating and maintained there for 90 minutes. Excess toluene was then removed by vacuum distillation. No free dimethyl sulphate was detected in the product by gas-liquid chromatography. This product was Dispersing Agent 1.

EXAMPLE 9

A mixture of 3 g of Pigment Yellow 13 (VYNAMON Yellow GE), 0.6 g of Dispersing Agent 1, 0.3 g of Fluidising Agent 1 and 6.1 g of SBP 3 was ball milled for 16 hours to give a fluid dispersion of the pigment. This dispersion was deflocculated and stable with the pigment in a finely divided form.

EXAMPLES 10 TO 12

Three dispersions, having the formulations described in Table 2, were prepared by ball milling the components for 16 hours. All the dispersions of were fluid, stable and deflocculated with the pigment in a finely divided form.

TABLE 2

| Example | Pigment and amount thereof | Dispersing agent and amount thereof | Fluidising agent and amount thereof | Organic liquid |
|---|---|---|---|---|
| 10 | 3 g of Pigment Yellow 1 | 0.6 g of Dispersing Agent 1 | 0.3 g of Fluidising Agent 1 | 6.1 g of SBP 3 |
| 11 | 3 g of Pigment Red 4 | 0.6 g of Dispersing Agent 1 | 0.3 g of Fluidising Agent 6 | 6.1 g of SBP 3 |
| 12 | 3 g of Pigment Yellow 13 | 0.6 g of Dispersing Agent 1 | 0.3 g of Fluidising Agent 1 | 6.1 g of HBPF |

HBPF is a petroleum fraction boiling at 220°–40° C.

EXAMPLES 13 TO 17 AND COMPARATIVE EXAMPLES (CE) 3 TO 5

These Examples describe dispersions which were prepared by ball milling 30 g of CI Pigment Yellow 13, 3.0 g of the Fluidising Agent (FA) or Comparative Agent (CA) indicated in Column 2 of Table 3, 6.0 g of Dispersing Agent 1 and 61.0 g of HBPF. The viscosities of the dispersions were measured with a probe rheometer immediately after milling, after standing for 1 hour and after standing for 56 hours.

The probe rheometer is an instrument which measures the resistance to penetration of a cylindrical rod as it passes into a fluid in a cylindrical vessel at a constant velocity. The rod is suspended from a spring and resistance to penetration of the rod into the fluid is detected by movement of the suspension arm between the rod and the spring as the vessel containing the fluid is moved upwardly at a constant velocity so that the rod passes at a constant velocity into the fluid along the cylindrical axis of the vessel. A transducer converts this movement into an electrical signal which is fed to a chart recorder. The recorder produces a straight line trace the angle of which to the direction of chart motion is proportional to the resistance to penetration of the rod into the fluid. The viscosity of a dispersion of a solid in a liquid, in Pascal.seconds (Pa.sec), can be derived from the angle of the trace produced as the rod penetrates the dispersion and the angle of the trace produced when the rod penetrates the liquid alone, i.e. without the other ingredients of the dispersion, using the following formula:

$$\text{Viscosity} = \frac{9.81z(R-r)(\tan a - \tan a')}{6.284 \cdot K \cdot r \cdot V^2}$$

wherein
V is the velocity of penetration of the rod (meters/sec)
r is the external radius of the rod (meters)
R is the internal radius of the vessel (meters)
K is the conversion factor between resistance to penetration and deflection of the chart recorder (meters/kilogram)
z is the chart speed (meters/sec)
a is the angle of the trace for the dispersion
a' is the angle of the trace for the liquid (HBPF) alone The shear rate (sec$^{-1}$) at which the viscosity is determined is given by the formula:

$$\text{Shear Rate} = V/(R-r)$$

which in the case of the present Examples was 0.044 cm$^{-1}$.

The results of the viscosity determinations are listed in Table 3 and illustrated graphically in FIG. 1 which is a plot of the mol% of N-acetoacetyl-4-sulphanilic acid in the mixture of coupling components from which the fluidising and comparative agents were prepared against the viscosity of the dispersions, in Pa.sec, to which these agents were added.

TABLE 3

| Example | Fluidising Agent | Viscosity Immediately After Milling (Pa.sec) | Viscosity After 1 hour Standing (Pa.sec) | Viscosity After 56 hours Standing (Pa.sec) |
|---|---|---|---|---|
| CE 3 | None | too viscous to measure | | |
| CE 4 | CA 1 | 12.2 | 16.4 | 168.0 |
| 13 | FA 2 | 6.0 | 8.0 | 18.6 |
| 14 | FA 3 | 6.0 | 8.0 | 10.1 |
| 15 | FA 1 | 4.6 | 6.0 | 8.0 |
| 16 | FA 4 | 10.1 | 12.2 | 14.3 |
| 17 | FA 5 | 73.4 | 365.0 | 467.0 |
| CE 5 | CA 2 | 2980.0 | too viscous to measure | |

These results demonstrate the improved fluidity of the dispersions of Examples 13 to 17 containing fluidising agents in accordance with the present invention (FA 1 to 5) compared with the dispersions of Comparative Examples 3 to 5 containing, respectively, no fluidising agent, a composition according, to UK Pat. No. 1,339,068 (CA 1) and a water-soluble dyestuff from UK Pat. No. 1,356,253 (CA 2). Fluidising agents prepared from mixtures of coupling components containing from 25% to 60%, by weight, of a coupling component carrying an acidic group (Examples 13 to 16) give rise to especially fluid dispersions, which maintain their fluidity over a long period

Pigment 1

Solution A:
Tetrazo-3,3'-dichlorobenzidine was prepared by tetrazotising 31.25 g of 3,3'-dichlorobenzidine in 500 g of water at 0° C.

Solution B:
A coupling solution was prepared by stirring 43.8 g of acetoacetanilide into 1000 g water, adding 46 g of a 33% solution of sodium hydroxide and warming until dissolution of the acetoacetanilide was complete. The solid was then reprecipitated by the addition of acetic acid, with vigorous stirring, until the pH was reduced to 5.5.

Coupling:
Solution A was added to Solution B over 90 minutes, the addition being below the surface of the vigorously stirred suspension of the coupling component. After about two thirds of Solution A had been added the pH was readjusted to 5.5 by the addition of a solution of sodium acetate. After the addition was complete, the temperature was raised to 90° C., and the suspension stirred for 2 hours. The product (Pigment 1), made using only a single coupling component free of acidic groups, was then filtered, washed with water and dried at 60° C.

Pigment 2

The procedure for Pigment 1 was followed except for the use of 39.4 g of acetoacetanilide and 5.5 g of N-acetoacetylaminobenzoic acid in place of the 43.8 g of acetoacetanilide used in the preparation of Solution B. The product (Pigment 2), made according to the teaching of UK Pat. No. 1,339,068 using 90 mol% of a coupling component free from acidic groups (acetoacetanilide) and 10 mol% of a coupling component containing an acidic group (N-acetoacetyl-4-aminobenzoic acid), was in the free acid form.

Pigment 3

The procedure of Example 8(b) was followed except for the omission of the treatment with DODMAH. The product (Pigment 3), made using 50 mol% of a coupling component free from acidic groups (acetoacetanilide) and 50 mol% of a coupling component containing an acidic group (N-acetoacetyl-4-aminobenzoic acid, was dried at 60° C. in the free acid form.

Pigment 4

The procedure of Comparative Example 1 was followed except for the treatment with DODMAC. The product (Pigment 4), made using 90 mol% of a coupling component free from acidic groups (acetoacetanilide) and 10 mol% of a coupling component containing an acidic group (N-acetoacetyl-4-sulphanilic acid), was dried at 60° C. in the free acid form.

Pigment 5

The procedure of Example 1 was followed except for the treatment with DODMAC. After filtration and washing the product (Pigment 5), made using 50 mol% of a coupling component free from acidic groups (acetoacetanilide) and 50 mol% of a coupling component containing an acidic group (N-acetoacetyl-4-sulphanilic acid), was dried at 60° C. in the free acid form.

COMPARATIVE EXAMPLE 6

Each of Pigments 1 to 5 was evaluated as a pigment in a gravure ink based upon a varnish medium comprising a solution of a phenolic resin (MITCHENOL 38B) in toluene. Each ink was prepared by dispersing the pigment at a concentration of 16.6% in the varnish medium. After milling the concentrated inks were diluted by the addition of a mixture of the varnish medium and toluene such that each ink had the same viscosity (8 seconds; Efflux cup flow time). The pigment strength of each ink was assessed by comparing ink scrapedowns on paper after the addition of varying amounts of resin solution. The brightness, gloss and transparency of the pigments were assessed by comparing scrapedowns of equal strength. The results are reported in Table 4.

TABLE 4

| Pigment | Strength | Brightness | Gloss | Transparency |
|---|---|---|---|---|
| 1 | | | Control | |
| 2 | stronger 80:100 | much brighter | equal | equal |
| 3 | weaker 167:100 | little brighter | inferior | little less |
| 4 | stronger 80:100 | little duller | equal | trace less |
| 5 | weaker | equal | inferior | equal |

TABLE 4-continued

| Pigment | Strength | Brightness | Gloss | Transparency |
|---|---|---|---|---|
| | 200:100 | | | |

These results demonstrate the deterioration in pigmentary properties when the proportion of coupling component is raised above the upper limit of 20 mol% taught in UK Pat. No. 1,339,068. Both the pigments in accordance with UK Pat. No. 1,339,068, Pigments 2 and 4, perform about as well as the control, Pigment 1, made using only an acid free coupling component whereas the pigments containing much higher levels of an acidic coupling component, Pigments 3 and 5, have very poor pigmentary properties. Thus any advantage which might be gained in fluidity by moving above the limits taught in UK Pat. No. 1,339,068 are more than offset by a deterioration in pigmentary properties. The present inventors have, however, found that the compounds made with higher levels of acid coupling component, after conversion into the substituted ammonium salts, are particularly useful in enhancing the fluidity of dispersions of normal pigments.

EXAMPLE 18

Two dispersions were prepared by ball milling for 16 hours each of the following formulations:

Formulation A 3.00 g of Pigment 1
0.75 g of Fluidising Agent 1
0.60 g of Dispersing Agent 1
5.65 g of SBP 3

Formulation B 3.75 g of Comparative Agent 1
0.60 g of Dispersing Agent 1
5.65 g of SBP 3

These Formulations were prepared from pigment compositions made using the same proportions of acetoacetanilide and the potassium salt of N-acetoacetyl-4-sulphanilic acid. Formulation A was made according to the present invention using a small proportion of a composition according to the present claims (Fluidising Agent 1, made with a equimolecular mixture of acetoacetanilide and potassium N-acetoacetyl-4-sulphanilate) in conjunction with a standard pigment (Pigment 1, made with acetoacetanilide alone) and a dispersing agent (Dispersing Agent 2). Formulation B was made according to the teaching of UK Pat. No. 1,339,068 using a pigment composition (Comparative Agent 1 made with a 0.9:0.1 mixture of acetoacetanilide and potassium N-acetoacetyl-4-sulphanilate, respectively) and a dispersing agent (Dispersing Agent 2). The relative proportions of the ingredients were selected so that the pigment compositions in the two formulations contained the same amounts of acetoacetanilide groups and the same amounts of N-acetoacetyl-4-sulphanilate groups.

After milling was complete Formulation A was fluid and the pigment particles in the dispersion were finely divided and deflocculated. Formulation B was very viscous and the pigment particles in the dispersion were coarse. This Example demonstrates the advantage of a combination of a normal pigment and fluidising agent containing a high proportion of acidic end groups (present invention) over a modified pigment containing a relatively small proportion of acidic end groups (UK Pat. No. 1,339,068) although both contain the same relative proportions (9:1) of acidic and non-acidic end groups.

EXAMPLE 19

This example was prepared in the same manner as Example 6, except that Solution A was prepared by tetrazotising 16.97 g of 3,3'-dichlorobenzidine at 0° C. The coupled product was reacted with 26 g of DODMAC. This final product is Fluidising Agent 9.

EXAMPLE 20

Solution A:
Tetrazo-3,3'-dichlorobenzidine was prepared by tetrazotising 11.7 g of 3,3'-dichlorobenzidine in 250 g of water at 0° C.

Solution B:
A mixture of 12 g of 4-chloro-2,5-dimethoxyacetoacetanilide and 14.32 g of the potassium salt of N-acetoacetyl-4-sulphanilic acid in 200 g water was prepared. The mixture was warmed to 40° C. and a 32% solution of sodium hydroxide added, with stirring, until complete solution occurred. The solution was cooled, and 12.5 g of acetic acid and 14 g of 36% hydrochloric acid were added while stirring rapidly.

Coupling:
Solution A was added to Solution B over 30 minutes, the pH being controlled at 4.3 by the addition of sodium acetate. The resulting mixture was stirred overnight, then heated to 90° C. and cooled to 70° C. 25.5 g DODMAC was added and the mixture stirred for a further hour at 70° C. The product, Fluidising Agent 10, was filtered off, washed with water and dried at 50°-60° C.

EXAMPLE 21

This example was prepared in the same way as Example 1, except that the dioctadecyldimethylammonium chloride was replaced by 39.2 g of hexadecyltrimethylammonium bromide. The product is Fluidising Agent 11.

EXAMPLE 22

This example was prepared in the same way as Example 1, except that the DODMAC was replaced by 28 g octadec-12-enyldimethyl amine. The product is Fluidising Agent 12.

EXAMPLE 23

This example was prepared in the same way as Example 1, except that DODMAC was replaced by 28.4 g dodecyltrimethylammonium chloride. The product is Fluidising Agent 13.

EXAMPLES 24 TO 43

Table 5 gives examples of dispersions, prepared by ball milling the components for 16 hours. In all cases the presence of the Fluidising Agent improved the fluidity of the dispersion.

TABLE 5

| Example | Pigment and amount thereof | Dispersing Agent and amount thereof | Fluidising Agent and amount thereof | Organic liquid |
|---|---|---|---|---|
| 24 | 3 g of Pigment Red 111 | 0.6 g of Dispersing Agent 1 | 0.3 g of Fluidising Agent 6 | 6.1 g of SBP3 |
| 25 | 3 g of Pigment Yellow 13 | 0.6 g of Dispersing Agent 1 | 0.3 g of Fluidising Agent 10 | 6.1 g of SPB3 |
| 26 | 3 g of Pigment Yellow 13 | 0.6 g of Dispersing Agent 1 | 0.3 g of Fluidising Agent 11 | 6.1 g of SBP3 |
| 27 | 3 g of Pigment Yellow 13 | 0.6 g of Dispersing Agent 1 | 0.3 g of Fluidising Agent 12 | 6.1 g of SBP3 |
| 28 | 3 g of Pigment Yellow 13 | 0.6 g of Dispersing Agent 1 | 0.3 g of Fluidising Agent 13 | 6.1 g of SBP3 |
| 29 | 3 g of Pigment Red 4 | 0.6 g of Dispersing Agent 1 | 0.3 g of Fluidising Agent 9 | 6.1 g of SBP3 |
| 30 | 3 g of Pigment Yellow 83 | 0.6 g of Dispersing Agent 1 | 0.3 g of Fluidising Agent 10 | 6.1 g of SBP3 |
| 31 | 3 g of Pigment Yellow 83 | 0.6 g of Dispersing Agent 1 | 0.3 g of Fluidising Agent 1 | 6.1 g of SBP3 |
| 32 | 3 g of Pigment Yellow 3 | 0.6 g of Dispersing Agent 1 | 0.3 g of Fluidising Agent 1 | 6.1 g of SBP3 |
| 33 | 3 g of Pigment Yellow 16 | 0.6 g of Dispersing Agent 1 | 0.3 g of Fluidising Agent 1 | 6.1 g of SBP3 |
| 34 | 3 g of Pigment Yellow 74 | 0.6 g of Dispersing Agent 1 | 0.3 g of Fluidising Agent 1 | 6.1 g of SBP3 |
| 35 | 2.5 g of Pigment Yellow 13 | 0.5 g of Dispersing Agent 1 | 0.25 g of Fluidising Agent 1 | 6.75 g of methyl isobutyl ketone |
| 36 | 2.5 g of Pigment Yellow 13 | 0.5 g of Dispersing Agent 1 | 0.25 g of Fluidising Agent 1 | 6.75 g of butyl acetate |
| 37 | 4 g of Pigment Red 3 | 0.8 g of Dispersing Agent 1 | 0.4 g of Fluidising Agent 7 | 4.8 g of SBP3 |
| 38 | 3 g of Pigment Yellow 13 | 1.5 g of a 40% solution of Agent 1 in UK Patent 1393401 | 0.3 g of Fluidising Agent 1 | 5.2 g of SBP3 |
| 39 | 3 g of Pigment Red 4 | 0.6 g of Dispersing Agent 1 | 0.3 g of Fluidising Agent 7 | 6.1 g of SBP3 |
| 40 | 3 g of Pigment Yellow 13 | 0.6 g of Dispersing Agent 1 | 0.3 g of Fluidising Agent 8 | 6.1 g of SBP3 |
| 41 | 3 g of Pigment Red 4 | 0.48 g of Dispersing Agent 1 | 0.12 g of Fluidising Agent 7 | 6.4 g of white spirit |
| 42 | 3 g of Pigment Yellow 1 | 0.4 g of Dispersing Agent 1 | 0.2 g of Fluidising Agent 1 | 6.4 g of white spirit |
| 43 | 3 g of Pigment Yellow 13 | 0.6 g of Dispersing Agent 1 | 0.75 g of Fluidising Agent 1 | 5.65 g of SBP3 |
| 44 | 3 g of Pigment Yellow 13 | 3.6 g of Dispersing Agent 2 | 0.3 g of Fluidising Agent 1 | 3.1 g of SBP3 |

Dispersing Agent 2

This dispersing agent, as used in Example 44 above, was a liquid made by dissolving 2.0 g of EURELON 934, the polyamide resin used in Example 76 of UK Pat. No. 1,508,576, in 10 g of a 50:50 mixture of isobutanol and SBP 3.

The words "AMBERLYST", "VYNAMON", "MITCHENOL" and "EURELON" are believed to be registered trade marks in certain countries.

We claim:
1. A composition of disazo compounds which contains at least 30%, by weight, of a water-insoluble asym- metric compound disazo compound, the asymmetric compound, comprising a central divalent group free from acidic and other ionic substituents linked through azo groups to two monovalent end groups characterised in that one end group, the first, is free from acidic and other ionic substituents and the other end group, the second, carries a single substituted ammonium-acid salt group.

2. A composition according to claim 1 wherein the central divalent group of the asymmetric disazo compound is biphenylene or biphenylene substituted by a non-ionic radical selected from $C_{1-4}$-alkyl, $C_{1-4}$-alkoxy, halo, nitro and cyano.

3. A composition according to claim 1 wherein the first end group of the asymmetric disazo compound is selected from pyrazolin-5-on-4-yl, 2-hydroxynaphthl-yl and acetoacet-2-ylanilide each of which is unsubstituted or substituted by one or more groups selected from $C_{1-4}$-alkyl, $C_{1-4}$-alkoxy, $C_{1-4}$-alkoxycarbonyl, halo, nitro, cyano, phenylaminocarbonyl, naphthylaminocarbonyl and phenyl in which the phenyl and naphthyl groups are unsubstituted or substituted by one or more groups selected from $C_{1-4}$-alkyl, nitro, $C_{1-4}$-alkoxy, halo, and cyano.

4. A composition according to any one of claims 1 to 3 wherein the second end group of the asymmetric disazo compound is selected from pyrazolin-5-on-4-yl, 2-hydroxynaphth-1-yl and acetoacet-2-yl-anilide each of which groups carries a single substituted ammonium-acid salt group and is otherwise substituted or substituted by one or more radicals selected from $C_{1-4}$-alkyl, $C_{1-4}$-alkoxy, $C_{1-4}$-alkoxycarbonyl, halo, nitro, cyano, phenylaminocarbonyl, naphthylaminocarbonyl and phenyl in which the phenyl and naphthyl radicals are unsubstituted or substituted by one or more radicals selected from $C_{1-4}$-alkyl, nitro, $C_{1-4}$-alkoxy, halo, and cyano.

5. A composition according to claim 4 wherein the second end group is selected from acetoacet-2-ylanilide in which the substituted ammonium-acid salt group is in the 4 position on the benzene ring with respect to the amino group, 1-phenylpyrazolin-5-on-4-yl in which the substituted ammonium-acid salt group is in the 4 position on the phenyl substituent and 2-hydroxynaphth-1-yl in which the substituted ammonium-acid salt group is in the 6 position on the naphthalene ring.

6. A composition according to any one of claims 1 to 3 wherein the substituted ammonium-acid salt group is a quaternary ammonium sulphonate group.

7. A composition of disazo compounds containing from 30% to 70% by weight of a water-insoluble asymmetric disazo compound of the formula:

$$Y-X-A-X-Z \qquad I$$

wherein
A is selected from biphenylene, 3,3'-dichlorobiphenylene, 3,3'-dimethoxybiphenylene, 3,3'-dimethylbiphenylene and 2,2'-dichloro-5,5'-dimethoxybiphenylene;
X is

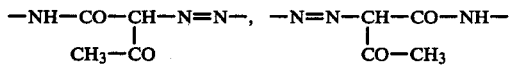

or $-N=N-$; when X is $-N=N-$,
Y is selected from pyrazolin-5-on-4-yl, 1-phenylpyrazolin-5-on-4-yl, 2-hydroxynaphth-1-yl and 2-hydroxy-3-(phenylaminocarbonyl)naphth-1-yl each of which may be substituted by one or more groups selected from $C_{1-4}$-alkyl, nitro, $C_{1-4}$-alkoxy, halo and $C_{1-4}$-alkoxycarbonyl;
and when X is

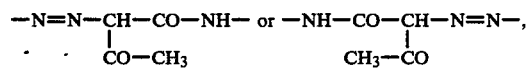

Y is phenyl or phenyl substituted by one or more groups selected from $C_{1-4}$-alkyl, $C_{1-4}$-alkoxy, halo and nitro;
and Z is selected from the same groups as Y except that it carries a substituted ammonium-acid salt group in addition to or in place of one of the substituents already on Y.

8. A dispersion of a pigment in an organic liquid containing a composition according to any one of claims 1 to 3.

9. A dispersion according to claim 8 containing a polyester-amide dispersing agent.

10. A dispersion according to claim 8 wherein the pigment is a monoazo or a disazo pigment.

11. A dispersion according to claim 10 wherein the pigment is a diarylide or condensed disazo pigment.

12. A pigment composition comprising a pigment and a composition of disazo compounds according to any one of claims 1 to 3.

* * * * *